United States Patent
Hooker et al.

(10) Patent No.: US 10,067,871 B2
(45) Date of Patent: Sep. 4, 2018

(54) LOGIC ANALYZER FOR DETECTING HANGS

(71) Applicant: VIA Alliance Semiconductor Co., Ltd., Shanghai (CN)

(72) Inventors: Rodney E. Hooker, Austin, TX (US); Douglas R. Reed, Austin, TX (US)

(73) Assignee: VIA ALLIANCE SEMICONDUCTOR CO., LTD, Shanghai (CN)

(*) Notice: Subject to any disclaimer, the term of this patent is extended or adjusted under 35 U.S.C. 154(b) by 211 days.

(21) Appl. No.: 14/891,337

(22) PCT Filed: Dec. 13, 2014

(86) PCT No.: PCT/IB2014/003174
§ 371 (c)(1),
(2) Date: Nov. 14, 2015

(87) PCT Pub. No.: WO2016/092345
PCT Pub. Date: Jun. 16, 2016

(65) Prior Publication Data
US 2016/0350223 A1    Dec. 1, 2016

(51) Int. Cl.
*G06F 12/08* (2016.01)
*G06F 9/30* (2018.01)
*G06F 9/38* (2018.01)
*G06F 9/52* (2006.01)
*G06F 12/0855* (2016.01)
(Continued)

(52) U.S. Cl.
CPC ......... *G06F 12/0855* (2013.01); *G06F 9/30* (2013.01); *G06F 9/38* (2013.01); *G06F 9/382* (2013.01); *G06F 9/524* (2013.01); *G06F 12/0864* (2013.01); *G06F 12/0897* (2013.01); *G06F 2212/60* (2013.01)

(58) Field of Classification Search
None
See application file for complete search history.

(56) References Cited

U.S. PATENT DOCUMENTS 4,791,554 A * 12/1988 Hirota .................... G06F 9/524
4,800,440 A    1/1989 Kurokawa
(Continued)

FOREIGN PATENT DOCUMENTS

| EP | 2503453 A1 | 9/2012 |
| EP | 2645237 A2 | 10/2013 |
| JP | 2010086496 | 4/2010 |

OTHER PUBLICATIONS

IFRA: Instruction Footprint Recording and Analysis for Post-Silicon Bug Localization in Processors by Park; Stanford; ACM 2008.*

(Continued)

Primary Examiner — Reginald G Bragdon
Assistant Examiner — Paul M Knight
(74) *Attorney, Agent, or Firm* — McClure, Qualey & Rodack, LLP

(57) ABSTRACT

A microprocessor comprises a cache including a tag array; a tagpipe that arbitrates access to the tag array; and a logic analyzer for investigating a starvation, livelock, or deadlock condition. The logic analyzer, which comprises read logic coupled to the tagpipe, is configured to record snapshots of transactions to access the tag array.

18 Claims, 10 Drawing Sheets

(51) Int. Cl.
    *G06F 12/0897*     (2016.01)
    *G06F 12/0864*     (2016.01)

(56) References Cited

U.S. PATENT DOCUMENTS

| | | | | |
|---|---|---|---|---|
| 5,133,074 | A | * | 7/1992 | Chou .................... G06F 9/524 |
| | | | | 711/146 |
| 5,241,635 | A | * | 8/1993 | Papadopoulos ....... G06F 9/3867 |
| | | | | 712/201 |
| 5,269,016 | A | * | 12/1993 | Butler .................... G06F 11/00 |
| | | | | 714/2 |
| 5,301,333 | A | | 4/1994 | Lee |
| 5,649,088 | A | * | 7/1997 | Hauck ................ G06F 11/1407 |
| | | | | 714/2 |
| 5,692,152 | A | * | 11/1997 | Cohen ................. G06F 12/0897 |
| | | | | 711/122 |
| 5,848,287 | A | | 12/1998 | Tran et al. |
| 5,987,561 | A | * | 11/1999 | Witt ...................... G06F 9/3004 |
| | | | | 711/128 |
| 6,073,199 | A | * | 6/2000 | Cohen ................... G06F 13/364 |
| | | | | 710/107 |
| 6,490,658 | B1 | * | 12/2002 | Ahmed ................. G06F 9/3455 |
| | | | | 711/137 |
| 6,543,002 | B1 | | 4/2003 | Kahle et al. |
| 6,553,512 | B1 | | 4/2003 | Gibson |
| 6,697,904 | B1 | | 2/2004 | Bennett |
| 6,904,431 | B2 | * | 6/2005 | Holmgren .......... G06F 17/30362 |
| 7,051,131 | B1 | | 5/2006 | Wiedenman et al. |
| 7,343,476 | B2 | | 3/2008 | Floyd et al. |
| 7,496,918 | B1 | | 2/2009 | Dice et al. |
| 7,590,825 | B2 | | 9/2009 | Krimer et al. |
| 7,657,693 | B2 | | 2/2010 | Singh et al. |
| 7,730,265 | B1 | * | 6/2010 | Cypher ................. G06F 12/126 |
| | | | | 710/200 |
| 8,103,833 | B2 | | 1/2012 | Koren et al. |
| 8,769,357 | B1 | | 7/2014 | Weintraub |
| 8,977,730 | B2 | * | 3/2015 | Nagpal .................... H04L 69/40 |
| | | | | 709/223 |
| 9,336,125 | B2 | | 5/2016 | Eggers et al. |
| 2001/0037446 | A1 | | 11/2001 | Asano et al. |
| 2002/0169931 | A1 | | 11/2002 | Krick et al. |
| 2002/0169935 | A1 | | 11/2002 | Krick et al. |
| 2002/0188821 | A1 | | 12/2002 | Wiens et al. |
| 2003/0131200 | A1 | * | 7/2003 | Berg .................... G06F 12/0813 |
| | | | | 711/141 |
| 2003/0229794 | A1 | * | 12/2003 | Sutton, II ............ G06F 12/1491 |
| | | | | 713/189 |
| 2004/0177236 | A1 | * | 9/2004 | Pickett ................... G06F 9/383 |
| | | | | 712/225 |
| 2004/0215933 | A1 | | 10/2004 | Nguyen et al. |
| 2006/0114921 | A1 | * | 6/2006 | Nakajima .............. H04L 47/24 |
| | | | | 370/412 |
| 2006/0218355 | A1 | | 9/2006 | Brabant et al. |
| 2006/0242517 | A1 | | 10/2006 | Pedley et al. |
| 2007/0226462 | A1 | | 9/2007 | Scott et al. |
| 2007/0253682 | A1 | * | 11/2007 | Chang ..................... H04N 5/76 |
| | | | | 386/200 |
| 2007/0297441 | A1 | | 12/2007 | Heil et al. |
| 2008/0071955 | A1 | | 3/2008 | Johns et al. |
| 2008/0091883 | A1 | | 4/2008 | Cox et al. |
| 2008/0159176 | A1 | | 7/2008 | Heil et al. |
| 2008/0215823 | A1 | * | 9/2008 | Hosomi ............. G06F 12/0833 |
| | | | | 711/146 |
| 2008/0301374 | A1 | | 12/2008 | Hall et al. |
| 2009/0019231 | A1 | * | 1/2009 | Cypher .................... G06F 12/08 |
| | | | | 711/141 |
| 2009/0077425 | A1 | | 3/2009 | Gschwind et al. |
| 2009/0210286 | A1 | * | 8/2009 | Bisdikian ............. G06Q 10/087 |
| | | | | 705/400 |
| 2010/0286952 | A1 | | 11/2010 | Mukherjee et al. |
| 2011/0055921 | A1 | * | 3/2011 | Narayanaswamy ........................ |
| | | | | H04L 63/1458 |
| | | | | 726/22 |
| 2012/0254271 | A1 | | 10/2012 | Kitamura |
| 2013/0054852 | A1 | * | 2/2013 | Fuoco ................. G06F 13/4022 |
| | | | | 710/110 |
| 2013/0318530 | A1 | * | 11/2013 | Hooker ................... G06F 9/526 |
| | | | | 718/102 |
| 2013/0339975 | A1 | * | 12/2013 | Busaba ..................... G06F 9/44 |
| | | | | 718/104 |
| 2014/0047151 | A1 | | 2/2014 | Feehrer et al. |
| 2014/0052966 | A1 | | 2/2014 | Vahidsafa et al. |
| 2014/0115267 | A1 | | 4/2014 | Pierson et al. |
| 2014/0173342 | A1 | * | 6/2014 | Kaushikkar ........... G06F 11/273 |
| | | | | 714/30 |
| 2015/0121046 | A1 | | 4/2015 | Kunjan et al. |
| 2016/0350167 | A1 | | 12/2016 | Hooker et al. |
| 2016/0350215 | A1 | | 12/2016 | Reed |
| 2016/0350224 | A1 | | 12/2016 | Hooker et al. |

OTHER PUBLICATIONS

A Distributed AXI-based Platform for Post-Silicon Validation; McGill; IEEE 2011.*
CADRE CycleAccurate Deterministic Replay for Hardware Debugging; Sarangi (Year: 2006).*
PCT/IB2014/003174. International Search Report (ISR) and Written Opinion (WO). Provided by State Intellectual Property Office of the P.R. China, dated Sep. 7, 2015. Pages 1-7.
PCT/IB2014/003149. International Search Report (ISR) and Written Opinion (WO). Provided by State Intellectual Property Office of the P.R. China, dated Aug. 28, 2015. pp. 1-7.
PCT/IB2014/003181. International Search Report (ISR) and Written Opinion (WO). Provided by State Intellectual Property Office of the P.R. China, dated Sep. 9, 2015. pp. 1-8.
PCT/IB2014/003196. International Search Report (ISR) and Written Opinion (WO). Provided by State Intellectual Property Office of the P.R. China, dated Sep. 9, 2015. pp. 1-8.
Park, Sung-Boemet al. "IFRA: Instruction Footprint Recording and Analysis for Post-Silicon Bug Localization in Processors." *DAC 2008*. Jun. 8-13, 2008. Anaheim, California. pp. 373-378.
Neishaburi, M.H. et al. "A Distributed AXI-based Platform for Post-Silicon Validation," 2011 29th IEEE VLSI Test Symposium. pp. 8-13.
Koren, Israel et al. "Saturating Counters: Application and Design Alternatives." Proceedings of the 16th IEEE Symposium on Computer Arithmetic (ARITH'03) 2003 IEEE. pp. 1-8.
Wright, David R. "Finite State Machines." CSC216, Summer 2005. pp. 1-28.

* cited by examiner

LOGIC ANALYZER FOR DETECTING HANGS

CROSS-REFERENCE TO RELATED APPLICATIONS

This application is related to the following U.S. Non-Provisional Applications filed concurrently herewith, each of which is a national stage application under 35 U.S.C. 371 of the correspondingly indicated International Application filed Dec. 13, 2014, each of which is hereby incorporated by reference in its entirety.

| U.S. Non-Provisional Ser. No. | International Application No. |
|---|---|
| 14/891,337 | PCT/IB2014/003174 |
| 14/891,338 | PCT/IB2014/003149 |
| 14/891,339 | PCT/IB2014/003181 |
| 14/891,340 | PCT/IB2014/003196 |

FIELD OF THE INVENTION

The invention relates to hang detection logic, and more particularly, to hang detection logic for a last level cache.

BACKGROUND

The tag pipeline to a last-level cache (LLC) provides a way to access the tag, MESI, and LRU arrays. The tag pipeline (also referred to herein as a tagpipe) prioritizes requests and makes decisions about how to respond to certain requests. For instance, a load request from a lower level cache, such as the L1D, causes a queue entry to be pushed for the purposes of tracking state. The data load queue entry then arbitrates for ownership to the tag pipeline. Once it is granted ownership to the tag pipeline, the queue entry accesses the tag MESI array to see if its address is in the array. If it is, then at the end of the pipeline the queue entry decides, based on whether the address is in the cache and on what other caches have the line, whether there will be a hit or miss, or whether it will need to snoop other caches.

The logic used to arbitrate access to the LLC can result in hangs that are neither the fault of a coding error nor predictable to a programmer. For instance, deadlocks occur when a single request or pair of requests do not complete. The requests repeatedly arbitrate into the pipeline and replay. One common cause of deadlocks is a request waiting on some external stimulus. Another common cause is the existence of a dependency chain in which each one of a pair of requests is waiting for the other of the requests to complete.

Another common example is live hangs and starvations that occur when, in a multi-threaded program, each thread competes for the same shared resource. In code, ownership is often signaled by a variable that is a zero if the resource is available, and a one if the resource is not available (i.e., already owned by one of the threads). The threads set the bit to one while also reading the bit, to see if they are able to gain ownership. If a thread can read a zero but set a one, that thread now gains ownership. When one thread gains ownership, the other threads constantly do read-modify-writes to this location, waiting for the first thread to release the shared resource. Hangs occur where thread zero owns the resource, and is finished with its task, but is prevented from writing a zero to release the resource by threads one and two's repeated read-modify-writes attempting to acquire the resource. These kinds of starvation conditions are unintended features of an architecture that determines how loads are prioritized with respect to other loads and are difficult to predict.

In practice, it may be more efficient in terms of cost, processing speed, and logical complexity to create a microprocessor that detects and responds to common deadlock conditions than it is to create a microprocessor in which such conditions never or rarely occur. Accordingly, there is a need for heuristic-based tagpipe traffic monitoring logic to detect patterns indicative of a hang. There is also a need for logic that responds to detected hangs in an attempt to resolve them.

SUMMARY

The invention may be expressed in many forms. One form in which it may be expressed is as a microprocessor comprising a cache including a tag array; a tagpipe that arbitrates access to the tag array; and a logic analyzer for investigating a starvation, livelock, or deadlock condition.

Over the course of a large number of clocks, e.g., one thousand clocks, deadlocks frequently manifest as a traffic pattern of very few completes, if any, a large majority of replays, and only one or two different kinds of arbs. The logic analyzer is provided to identify such traffic patterns.

The logic analyzer comprises read logic coupled to the tagpipe. It is configured to record snapshots of transactions to access the tag array, which are referred to herein as tagpipe arbs.

The tagpipe may comprise multiple stages, with the logic analyzer coupled to a stage of the pipeline after the tagpipe has determined whether an arb is going to replay, complete, and/or require other queue pushes.

The snapshots may comprise some or all of the following information: whether the tagpipe arb is a load, snoop, store or other arb type; whether the tagpipe arb completed or replayed; and information identifying a set and way to which the arb is assigned.

The logic analyzer may comprise logic to compress the snapshots by logically OR-ing together different types of replay conditions and store the snapshots into private random access memory (PRAM) of the microprocessor.

The logic analyzer may also comprise configuration logic that allows a user to selectively configure which snapshots the logic analyzer records and selectively configure starting and ending pointers between which to record snapshots of tagpipe arbs.

The invention can also be expressed in many other forms, some of which may be broader than the form expressed above. Accordingly, it should not be presumed that the form in which it is expressed above mirrors the form in which it is expressed in the claims.

DETAILED DESCRIPTION OF THE INVENTION

Figure 1:
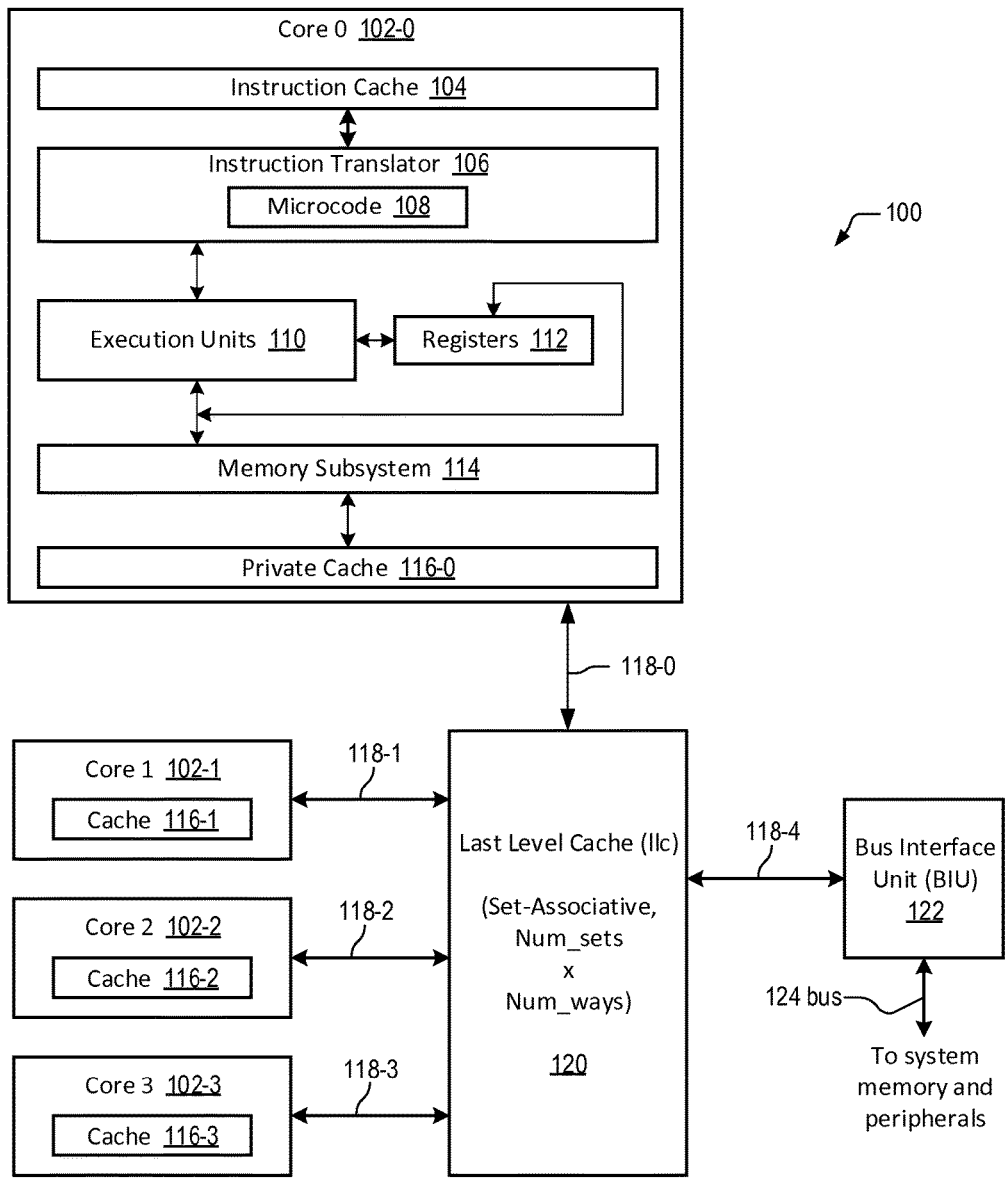
FIG. 1 is a block diagram of one embodiment of a multi-core microprocessor having a shared LLC.

Referring now to FIG. 1, a block diagram illustrating a multi-core microprocessor 100 is shown. The microprocessor 100 includes a plurality of processing cores 102, a shared last-level cache (LLC) memory 120, and a bus interface unit (BIU) 122.

In the example embodiment of FIG. 1, there are four cores 102 denoted core 0 102-0, core 1 102-1, core 2 102-2 and core 3 102-3, which are collectively referred to as cores 102 and generically individually referred to as core 102. Each of cores 102-0, 102-1, 102-2, 102-3 accesses the LLC 120 via a respective interface 118-0, 118-1, 118-2, 118-3, which are referred to collectively as interfaces 118 and generically individually as interface 118. The bus interface unit 122 also accesses the LLC 120 via an interface 118-4. The microprocessor 100 is part of a larger computing system (not shown) that includes system memory and peripherals (also not shown), with which the LLC 120 communicates via the bus interface unit 122 over a system bus 124. Although the embodiment of FIG. 1 illustrates a processor 100 with four cores 102, other embodiments with different numbers of cores 102 are contemplated. All of the cores 102 share the LLC 106.

Each processing core 102 comprises an instruction cache 104, an instruction translator 106 that includes microcode 108, execution units 110, architectural registers 112, and a memory subsystem 114 (e.g., a memory order buffer, data cache, and a table walk engine). The execution units 110 may include integer units, floating point units, media units, branch units, load units and store units. Other functional units (not shown) may include a table walk engine, which performs translation table walks to generate virtual to physical address translations; branch predictors; a rename unit; a reorder buffer; reservation stations; an instruction fetch unit; an instruction decoder; an instruction scheduler; an instruction dispatcher; data prefetch units; and non-architectural registers, among others. Various microarchitectural features may be included in the cores 102. For example, the cores 102 may be superscalar—capable of issuing multiple instructions per clock cycle to the execution units 110 for execution—or scalar. As another example, the cores 102 may execute instructions in-order or out-of-order, the latter enabling instructions to be issued for execution out of program order. In one embodiment, the cores 102 conform substantially to the x86 instruction set architecture, although the cores 102 are not limited to a particular instruction set architecture, and may include other memory request agents such as a graphic processing unit (GPU) or field programmable gate array (FPGA).

Each of cores 102-0, 102-1, 102-2, 102-3 also includes a respective private cache memory hierarchy 116-0, 116-1, 116-2, 116-3, which are referred to collectively as private cache memory hierarchies 116 and generically individually as private cache memory hierarchy 116. Preferably, the cache memories of the private cache memory hierarchies 116 are smaller than the LLC 120 and have a relatively small access latency. In one embodiment, the private cache memory hierarchy 116 includes a level-1 (L1) instruction cache (L1I) and L1 data cache (L1D).

Figure 2:
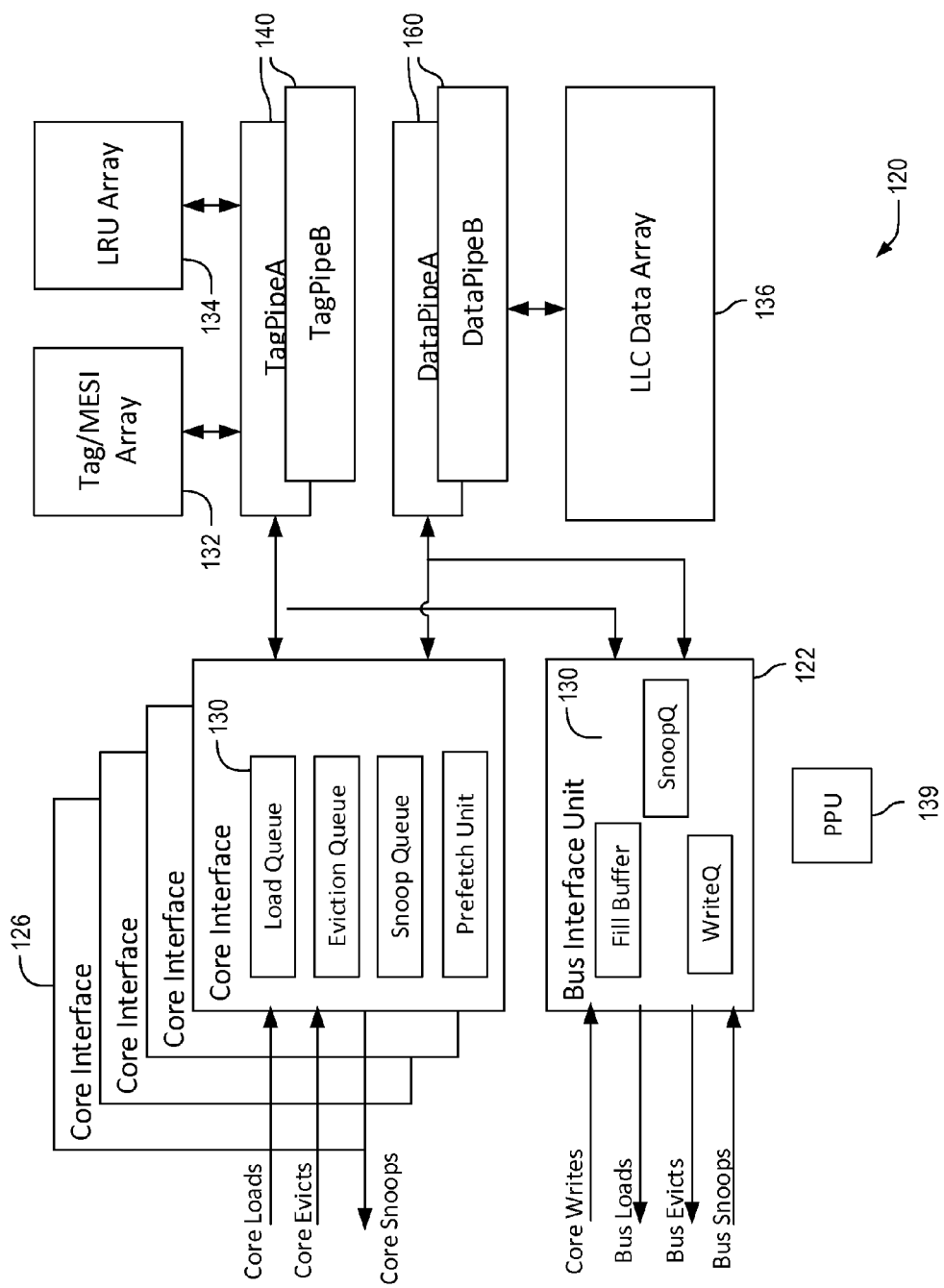
FIG. 2 is a block diagram of the LLC of FIG. 1.

FIG. 2 illustrates a high level block structure of a last level cache (LLC) 120 of the microprocessor. The LLC 120 includes several submodules, including core and bus interfaces 126 and 128 containing queues 130 that hold transient transaction state, arrays 132-136 holding tag, MESI, LRU, and data information, and one or more tag pipelines 140 (also referred to as "tagpipes") and data pipelines 160 (also referred to as "datapipes"), which allow queues to access shared arrays in a manner suitable for timing.

In the embodiment of FIG. 2, two tagpipes 140, TagPipeA and TagPipeB, are depicted to support the LLC of a quad-core processor. Two of the cores arbitrate for TagPipeA and the other two cores arbitrate for TagPipeB. In another embodiment (not shown), a single tagpipe 140 is provided for the LLC. In yet other embodiments (also not shown), three or more tagpipes 140 are provided.

A unique characteristic of the tagpipes 140 is that they operate as a central point through which almost all LLC traffic travels. Each tagpipe 140 provides access to Least-Recently-Used (LRU) and Tag/MESI arrays 132 and 134 and make action decisions for every queue entry arbitrating into the tagpipe 140. This characteristic makes the tagpipe 140 useful in detecting and avoiding hangs.

The queues 130 of the LLC may be grouped into core interface queues and external interface queues. Examples of core interface queues include a load queue, which handles loads from an L1 cache (or an intermediary cache) to the LLC, an eviction queue, which handles evictions from the L1 cache to the LLC, and the snoop queue, which handles snoops from the LLC to the L1 cache. In one embodiment, separate load, eviction, and snoop queues are provided for data and code. In another embodiment, a group of such core interface queues are provided for each core of the processor.

The External Interface queues include a Fill Buffer, which handles new allocations into the LLC and evictions from the LLC, a Snoop Queue, which handles snoops originating from the Bus, and a Write Queue, which handles (among other things) bus writes from the cores.

The LLC also includes other small blocks, including state machines, verification features, and a PPU 139 that exercises Forth programs.

Transactions entering the LLC from the outside world (e.g., data loads) or materializing within the LLC (e.g., prefetches) push entries into their corresponding queue 130. The queue 130 is then responsible for maintaining the state required to complete the transaction, either by arbitrating into either the tag or data pipelines 140 or 160, communicating with an outside block, or both.

The microprocessor gives higher priorities to some types of transactions than some other types of transactions. In one embodiment, the highest priority transaction in the LLC is an L1d load. When the LLC detects a new load request, it stages the load request signal directly into the arbitration logic in parallel to the normal queue push, allowing the load to begin arbitrating as soon as the LLC detects the request.

Figure 3:
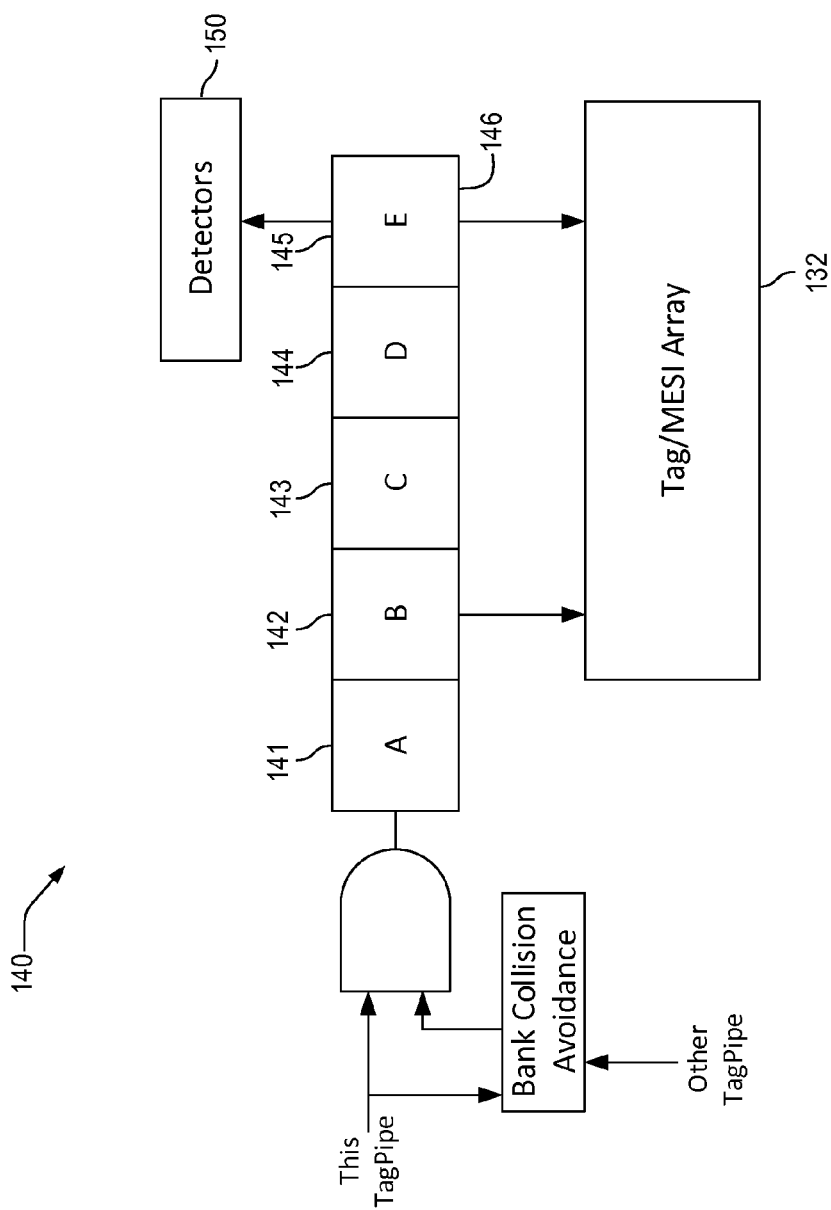
FIG. 3 is a block diagram of one embodiment of a tagpipe staging architecture for the LLC of FIG. 2.

FIG. 3 depicts one embodiment of a tagpipe 140 divided into a plurality of primary stages 141-145, designated A, B, C, D, and E respectively. Transactions to access the cache, referred to herein as "tagpipe arbs," advance through the stages of the tagpipe 140. During the A stage 141, a transaction arbitrates into the tagpipe 140. During the B stage 142, the tag is sent to the arrays. During the C stage, MESI information and indication of whether the tag hit or miss in the LLC is received from the arrays. During the D stage, a determination is made on what action to take in view of the information received from the array. During the E stage, the action decision (complete/replay, push a fillq, etc) is staged back to the requesting queues.

In one embodiment, the tagpipe 140 also includes subsequent stages, but these exist only for the purpose of providing forwarding paths from older requests to a newer request in the D stage. Accordingly, in the embodiment of FIG. 3, it is useful to monitor the E stage 145 using one or more types of detectors 150. However, the optimal stage(s) to monitor will vary with tagpipe design, for example, in embodiments with more or fewer stages. Thus, in FIG. 4, "Stage N" 149 symbolizes a tagpipe stage that contains a sufficient amount of information about an arb—in particular, whether an arb is going to replay, complete, and/or require other queue pushes—to enable the detection and analysis of a hang.

Figure 4:
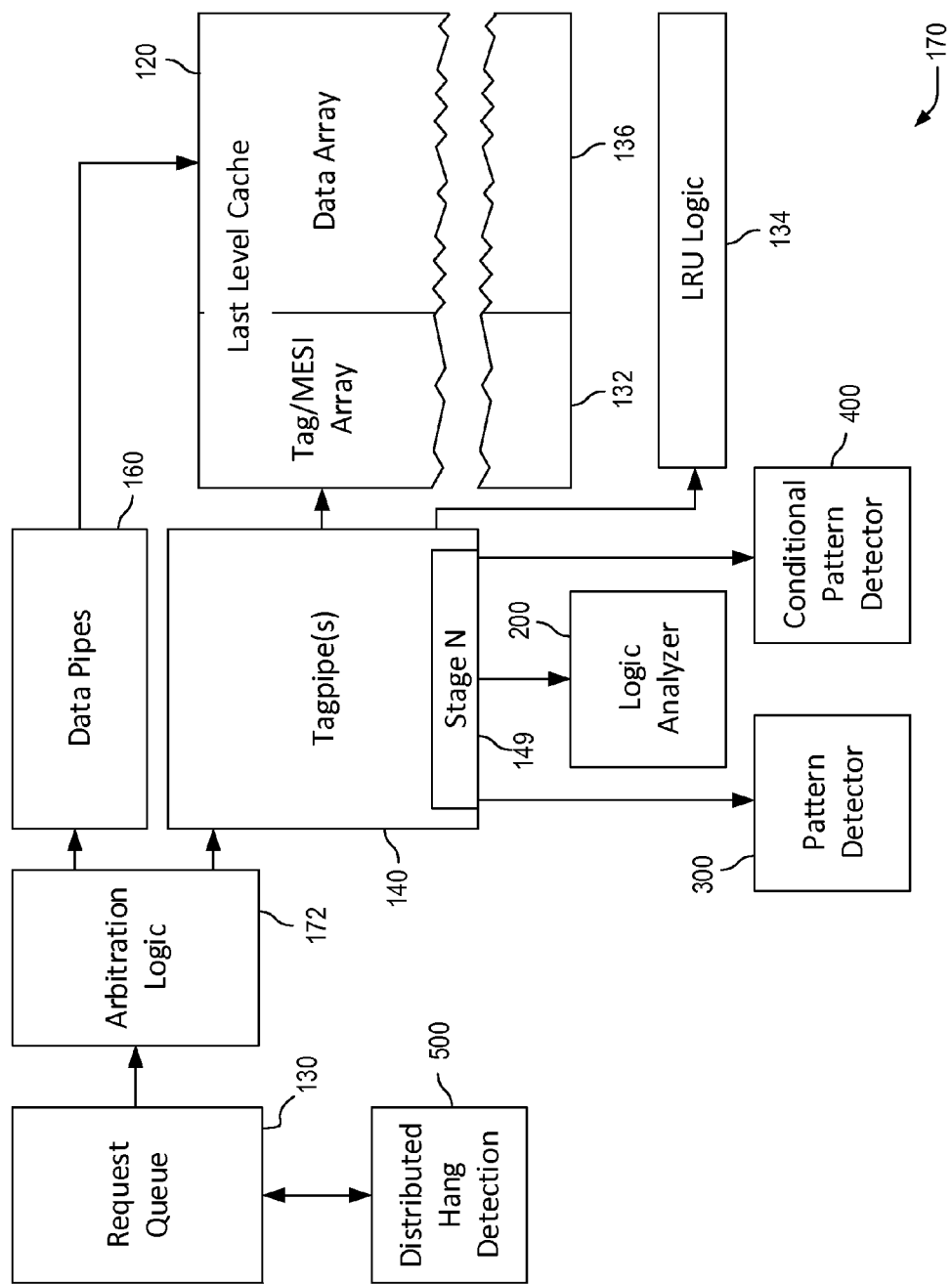
FIG. 4 is a block diagram illustrating a top-level view of one embodiment of a LLC and hang detection architecture.

FIG. 4 is a block diagram illustrating a top-level view of one embodiment of a last level cache and hang detection architecture 170. The LLC and hang detection architecture 170 comprises one or more data arrays 136, one or more tag arrays 132, and arbitration logic 172. Arbitration logic 172 coupled to request queues 130 and data pipes 160 arbitrates access into the data arrays 136. Arbitration logic 172 coupled to tagpipes 140 arbitrate access to the Tag/MESI array 132. Three different hang detectors—a logic analyzer 200, a pattern detector 300, and a conditional pattern detector 400—are coupled to Stage N 149 of the tagpipe 140 to detect one or more starvation, livelock, or deadlock conditions. Distributed hang detection logic 500, coupled to request queues 130, provide a plurality of recovery routines to recover from a hang.

Figure 5:
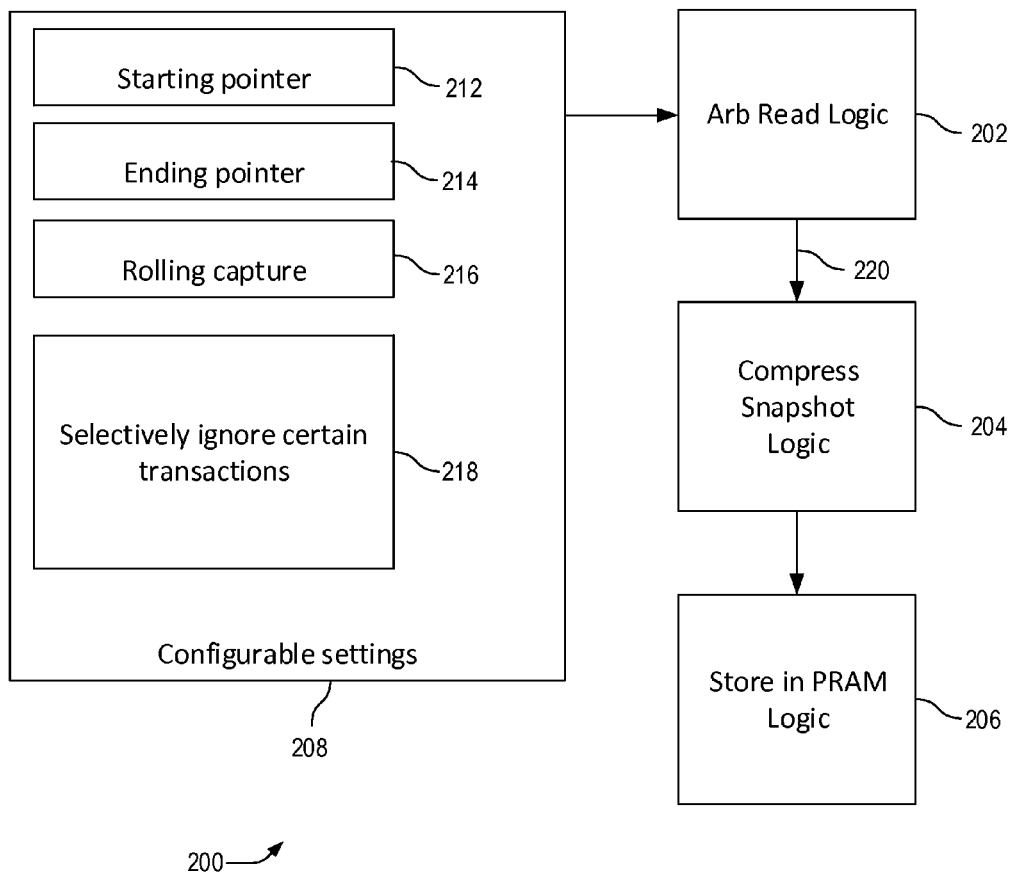
FIG. 5 is a block diagram illustrating the logic analyzer of FIG. 4.

FIG. 5 illustrates one embodiment of the logic analyzer 200 of FIG. 4. The logic analyzer 200 comprises arb read logic 202 connected to Stage N 149 of the tagpipe 140 that reads and captures snapshots 220 of tagpipe arbs. Configuration logic 208 enables a user to selectively configure the logic analyzer 200 to read and/or store information between starting and ending pointers 212 and 214, alternatively indicate whether to execute a rolling capture 216, and selectively ignore certain transactions 218. The compression logic 204 of the logic analyzer 200 takes the snapshots 220 captured by the arb read logic 202 and logically ORs together different types of replay conditions. Storage logic 206 stores the compressed snapshots into private random access memory (PRAM) of the microprocessor. This consolidated information is used to determine what tagpipe arbs comprise a hang or lead up to the hang.

Figure 6:
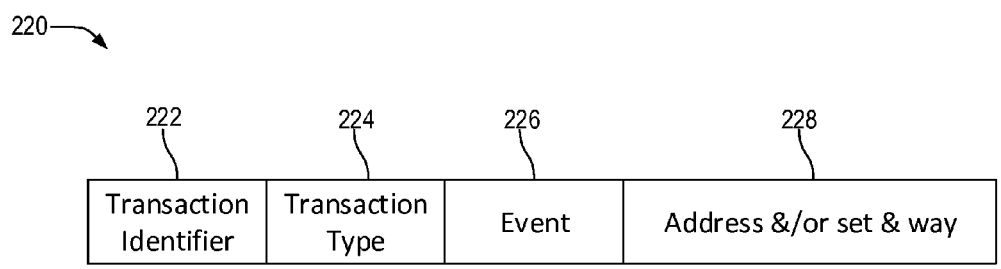
FIG. 6 illustrates the contents of one embodiment of a snapshot captured by the logic analyzer of FIG. 5.

As illustrated in FIG. 6, each snapshot 220 comprises a plurality of bits that store relevant information about the tagpipe arb. A transaction identifier 222 identifies the arb's queue index. For example, the transaction identifier 222 may be a number between 0 and 15. A transaction type field 224 identifies whether the corresponding tagpipe arb is a load, snoop, evict or other arb type. An event field 226 indicates whether the tagpipe arb completed or replayed. An assignment field 228 identifies other useful information about the arb, for example, a set and way to which the corresponding arb is assigned or a register bank associated with the arb. This is helpful for identifying hangs that may result from conditions determining the set and way to which an arb is assigned.

Figure 7:
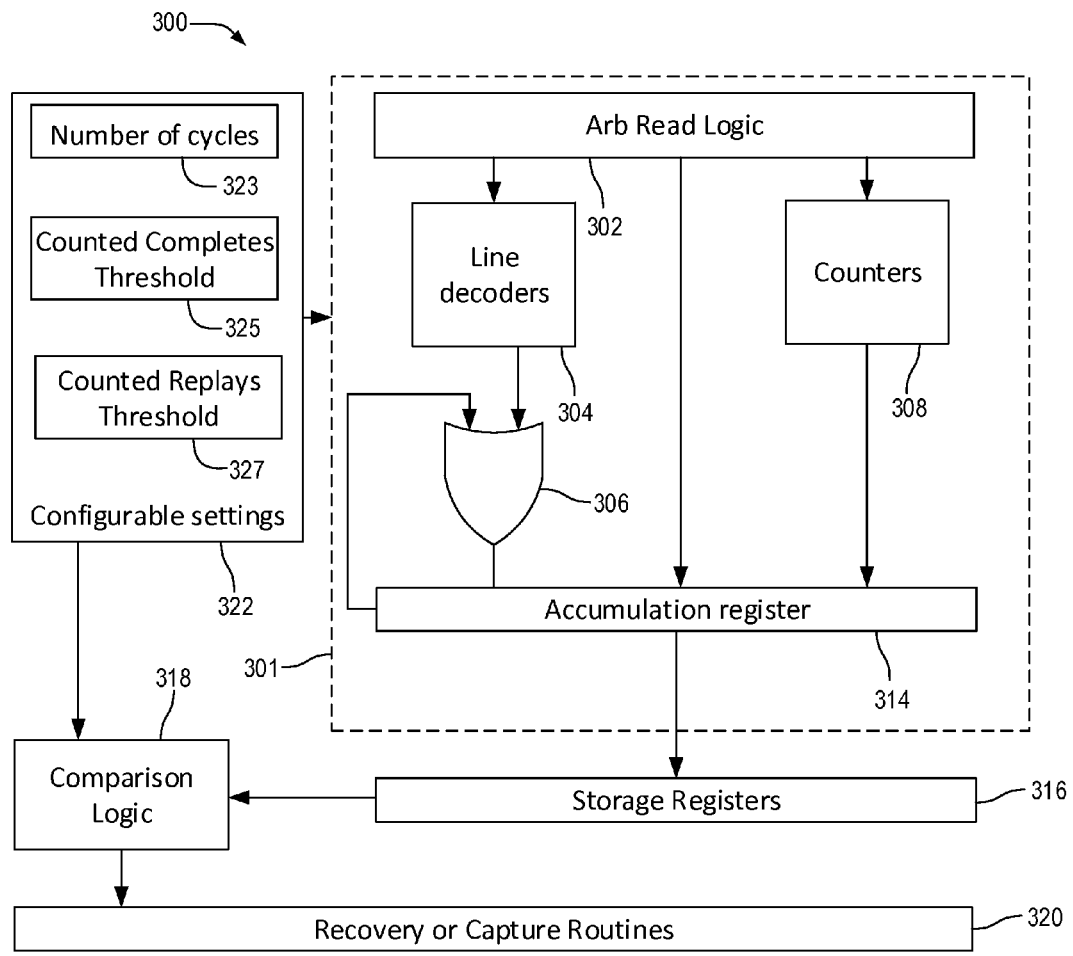
FIG. 7 is a block diagram illustrating the pattern detector of FIG. 4.

FIG. 7 is a block diagram of one embodiment of the pattern detector 300 of FIG. 4. The pattern detector 300 comprises snapshot capture logic 301, storage registers 316, a plurality of configurable settings 322, and comparison logic 318.

The snapshot capture logic 301 comprises arb read logic 302 connected to Stage N 149 of the tagpipe 140 that captures snapshots of tagpipe arbs. The snapshot capture logic 301 also comprises line decoders 304 that decode the x-digit transaction identifiers 222 and transaction types 224 of arbs advancing through the tagpipe 140 into $2^x$ bitfield representations of those transaction identifiers and types. An accumulator 306 then accumulates into an accumulation register 314 the decoded transaction identifiers and types.

For example, when recovered by the arb read logic 302, the transaction type 224 may be represented in the form of an X-bit (e.g., 4 bits) binary code. The decoder 342 decodes the X-bit transaction identifier into a Y-bit (e.g., 16 bit) field, where $2^X-1<Y<=2^X$, such that each bit of the Y-bit field represents a different kind (or category of similar kinds) of tagpipe arb. Because the accumulator 306 accumulates the transaction identifiers through a function that is a Boolean equivalent of a logical OR of a most recent decoded transaction identifier with a most recent accumulated value of the transaction identifiers, the accumulator 306 accumulates into the accumulation register 314 a bitmask of every kind of tagpipe arb that advances through the tagpipe 140 during a user-configurable period.

The pattern detector 300 also includes a plurality of arithmetic accumulators 308 that count certain events. For example, one arithmetic accumulator 308 counts the number of arb transactions that complete during the configurable period. Another arithmetic accumulator 308 counts the number of arbs that are replayed during the period. Yet another accumulator 308 accumulates a bitmask of the replay types encountered during the period.

Figure 8:
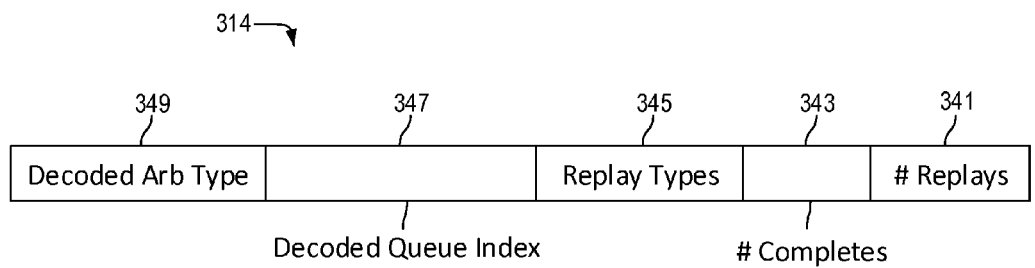
FIG. 8 illustrates the contents of one embodiment of an accumulation register incorporated into the pattern detector of FIG. 7.

FIG. 8 illustrates the contents of one embodiment of the accumulation register 314. Field 341, comprising bits 0-10, records the number of replays counted by the arithmetic accumulator 310. Field 343, comprising bits 11-18, records the number of completes counted by the arithmetic accumulator 308. Field 345, comprising bits 19-31, records the replay types detected during the period. Field 347, comprising bits 32-47, records the transaction identifiers (e.g., queue indices) encountered during the period. Field 349, comprising bits 48-63, records the decoded arb state received from the accumulator 306.

The pattern detector 300 provides user-configurable settings 322 to operate the pattern detector 300. These settings may include, for example, a configurable number of clock cycles 323 or a configurable number of valid transactions (not shown) to advance through the tagpipe 140. These settings may also include thresholds 325 and 327 for the number of counted completes and counted replays, respectively, to signal a hang.

Figure 9:
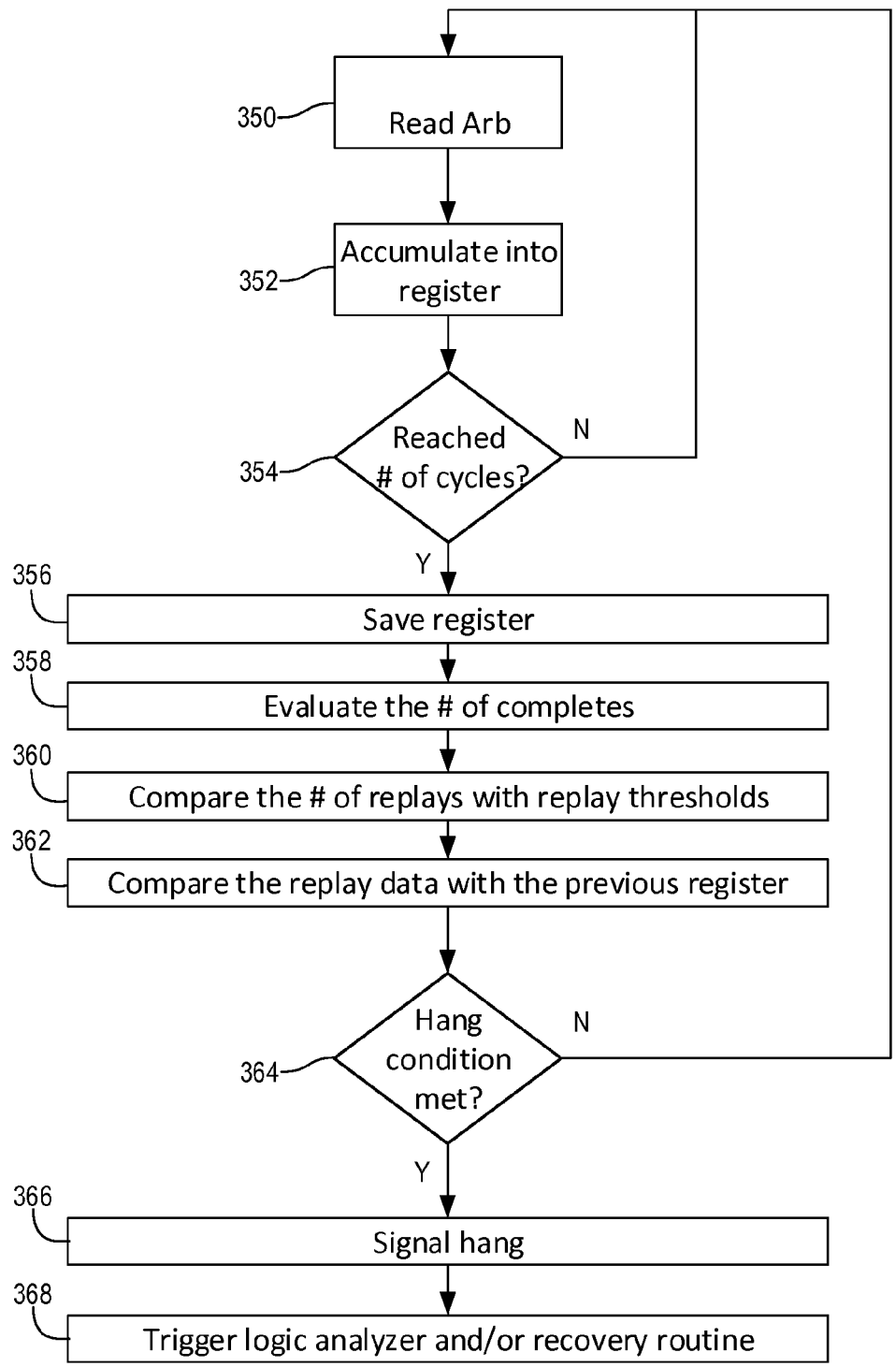
FIG. 9 is a functional block diagram illustrating an operation of the conditional pattern detector of FIG. 7.

FIG. 9 illustrates the operation of the pattern detector 300 of FIG. 6. In block 350, the arb read logic 302 generates a snapshot of the arb at Stage N 149. In block 352, the pattern detector 300 accumulates the snapshots into register 314. In block 354, the pattern detector 300 checks whether the user-configurable period has completed. If not, the pattern detector 300 continues to accumulate the snapshots into the register 314. If the user-configurable period is complete, then, in block 356, the pattern detector 300 saves the accumulated bits of the register 314 as a stored history in one of the storage registers 316. The microprocessor also clears the register 314, preparing it to accumulate a new bit mask for the subsequent period.

In blocks 358, 360, and 362, comparison logic 318 in the pattern detector 300 performs one or more predetermined and/or configurable comparisons. For example, the pattern detector 300 may evaluate whether the number of completes is below a user-configurable threshold 225 (block 358), whether the number of replays meets or exceeds the replay threshold 327 set in the user-configurable settings 322 (block 360), and/or compare the replay data of the two most recently saved registers to determine whether the counted number of replays in the two registers are the same or almost the same (block 362). The pattern detector 300 may also, or in the alternative, evaluate whether a difference between the counted number of replays and the counted number of completes exceeds a threshold. If, in block 364, one or more predetermined and/or configurable conditions are met, then in block 366, the pattern detector 300 signals a hang, which in turn triggers one or more recovery or capture routines 320 (block 368).

Figure 10:
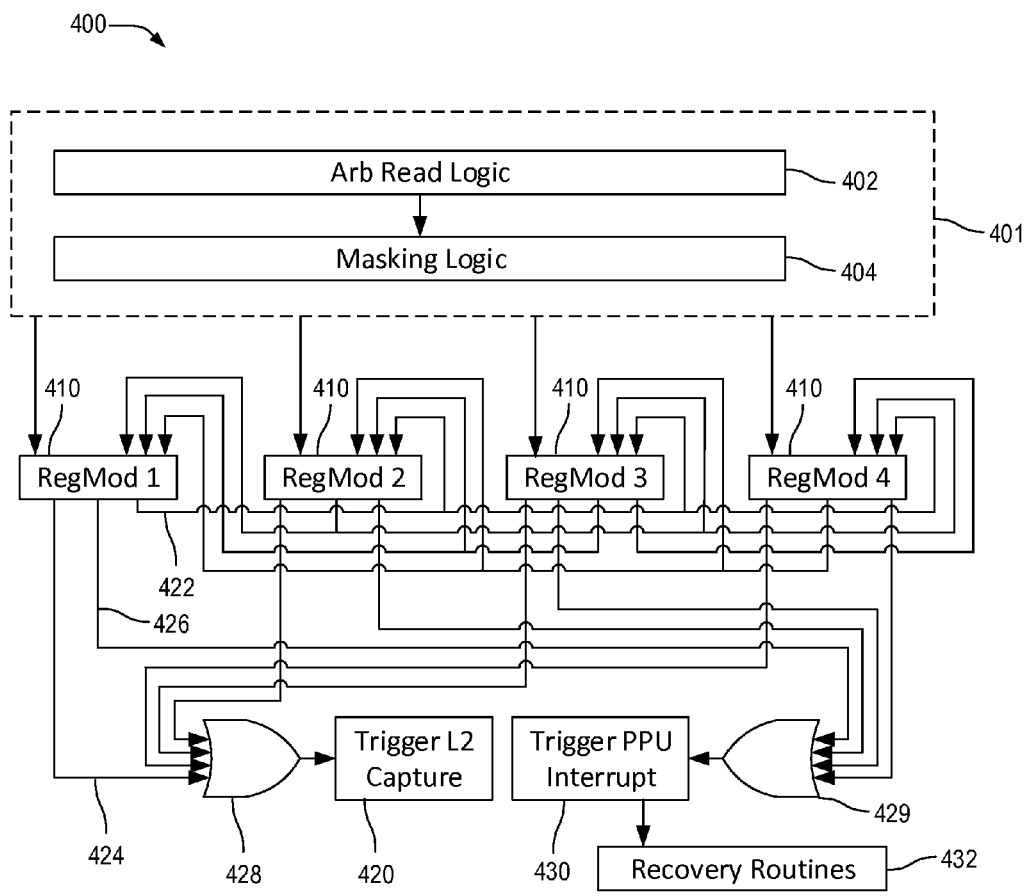
FIG. 10 is a block diagram illustrating the conditional pattern detector of FIG. 4.

FIG. 10 is a block diagram of one embodiment of the conditional pattern detector 400 of FIG. 4. The conditional pattern detector 400 is a more complex and configurable form of the pattern detector 300 of FIG. 7. The detector 400 comprises snapshot capture logic 401 that, like the snapshot capture logic 301 of FIG. 7, has arb read logic 402 and masking logic 404 to capture snapshots of tagpipe arbs. The detector 400 provides a plurality of configurable trigger register modules 410. Each trigger register module 410 has a plurality of configurable fields for detecting transactions that have specified properties, optionally conditioned on another trigger register module 410 being in a triggered state. The plurality of trigger register modules 410 are together configurable to detect a user-specified pattern of arbs, and to trigger an L2 capture and/or recovery responses 432 when the pattern is detected.

Each trigger register module 410 has three outputs. A first output 422, signaling that the trigger register module 410 is triggered, is provided to each of the other trigger register modules 410. A second output 424 signals downstream logic 420 to trigger an L2 capture, that is, to begin capturing everything passing through the tagpipe 140. The trigger L2 capture outputs 424 of each trigger register module 410 is OR'd together, as illustrated by OR block 428. A third output 426 signals downstream logic 430 to trigger a PPU interrupt, which in turn causes one or more recovery routines 432 to get executed. The trigger PPU outputs 426 of each trigger register module 410 is also OR'd together, as illustrated by OR block 429.

Figure 11:
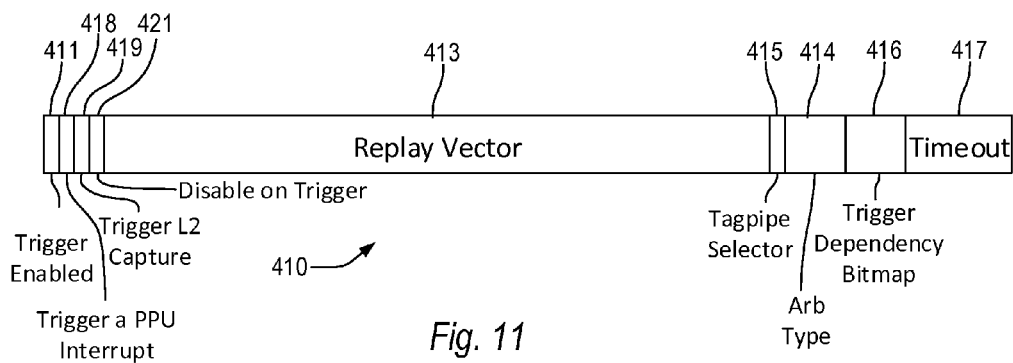
FIG. 11 illustrates the contents of one embodiment of one of the configurable registers of FIG. 10.

FIG. 11 illustrates the contents of one embodiment of the configurable trigger register module 410. The trigger register module 410 provides fields for specifying a replay vector 413, an arb type 414, a trigger dependency bitmap 416, and a timeout value 417. If the register module has a designated timeout period, then the timeout period starts when the register indicates that it is in a triggered state. After expiration of the timeout period, the pattern detector disables any dependent register modules from entering into a triggered state.

The trigger register module 410 also provides fields 418 and 419, each one bit in length, to enable the trigger register module 410 to trigger downstream logic to trigger a PPU interrupt or an L2 capture. Field 411 identifies whether the trigger is enabled. Field 421 specifies whether the register will stay enabled once it triggers. The configurable register module 410 may support more specialized fields, for example, a tagpipe selector 415.

Figure 12:
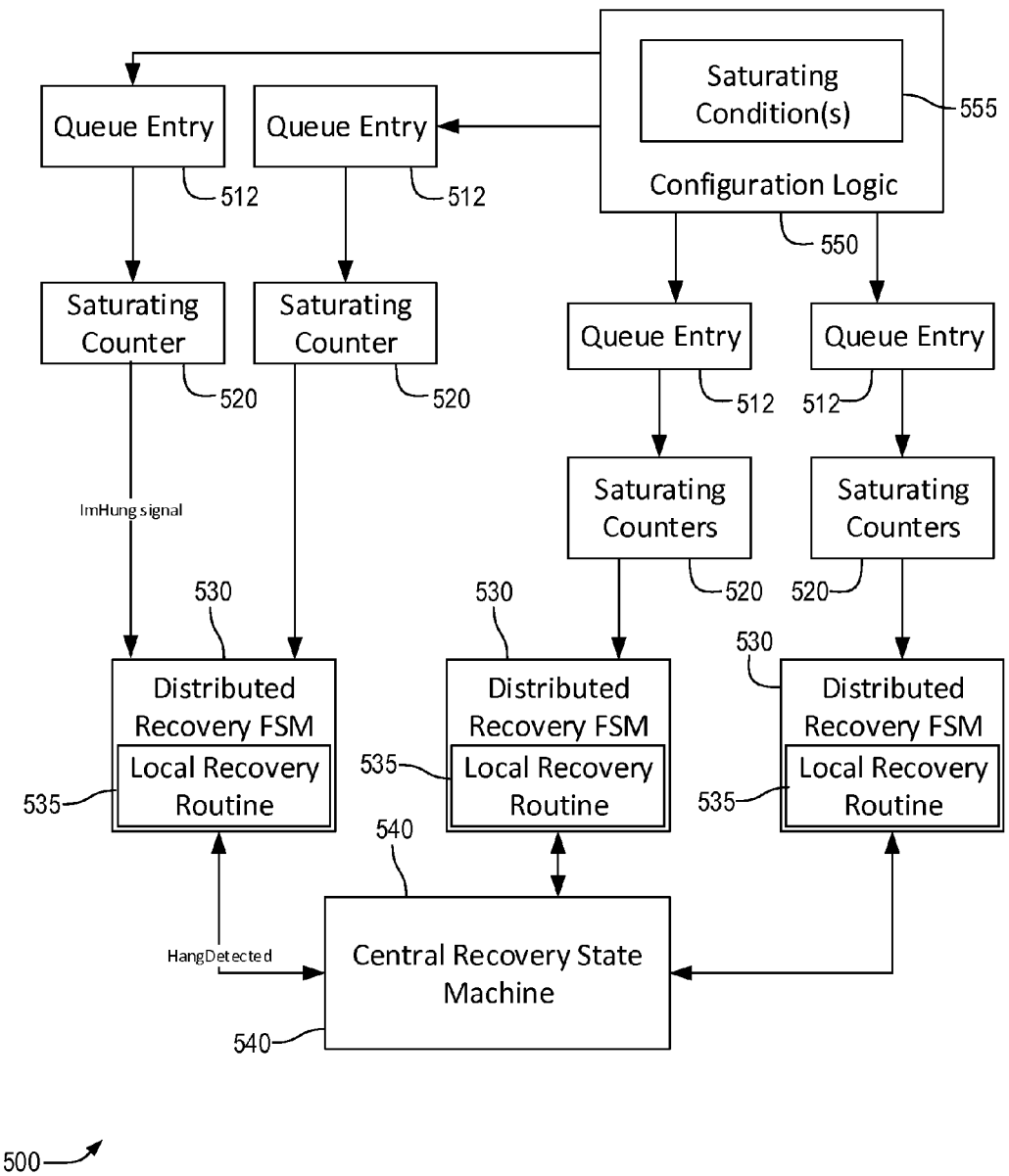
FIG. 12 illustrates one embodiment of a distributed hang logic architecture for detecting one or more likely starvation, livelock, or deadlock conditions.

FIG. 12 illustrates one embodiment of a distributed hang logic architecture 500 in a multi-processor microprocessor for detecting one or more likely starvation, livelock, or deadlock conditions. A plurality of queues 130 (FIG. 2), each containing a plurality of queue entries 512, contain transient transaction state information about cache-accessing transactions and transactions that bypass the cache (e.g., uncacheable loads). A plurality of detectors 520 monitor the plurality of queue entries 512 for one or more likely starvation, livelock, or deadlock conditions. A plurality of recovery logic modules 530 are distributed in the microprocessor. When a detector 520 detects a likely starvation, livelock, or deadlock condition, it communicates with its nearest recovery logic module 530 about its condition (e.g., an "ImHung" signal). Each recovery logic module 530, which in one embodiment constitutes a finite state machine, is configured to implement one or more local recovery routines 535 when a coupled detector 520 identifies a likely starvation, livelock, or deadlock condition.

In one embodiment, each queue entry 512 that requests arbitration into a last-level cache tagpipe 140 is associated with a corresponding detector 520. Also in one embodiment, the detectors 520 comprise saturating counters. Configuration logic 550 is provided to specify one or more conditions 555 to count.

In one embodiment, the distributed hang logic architecture 500 is configured to reset each saturating counter when an associated queue entry 512 is newly allocated, and to increment a saturating counter whenever an associated queue entry 512 is replayed. In a second embodiment, each saturating counter increments whenever an associated queue entry requests arbitration, but is not granted arbitration. In a third embodiment, each saturating counter increments whenever an associated queue entry is waiting for some external stimulus before requesting arbitration. In a fourth embodiment, each saturating counter saturates at a configurable threshold.

The distributed hang logic architecture 500 further comprises central recovery logic 540, which in one embodiment is also a finite state machine. When a recovery logic module 530 is notified by a detector 520 of a likely starvation, livelock, or deadlock condition, the recovery logic module 530 communicates with the central recovery logic 540. The central recovery logic 540 responsively instructs each of the plurality of recovery logic modules 530 to perform one or more of their own local recovery routines.

Figure 13:
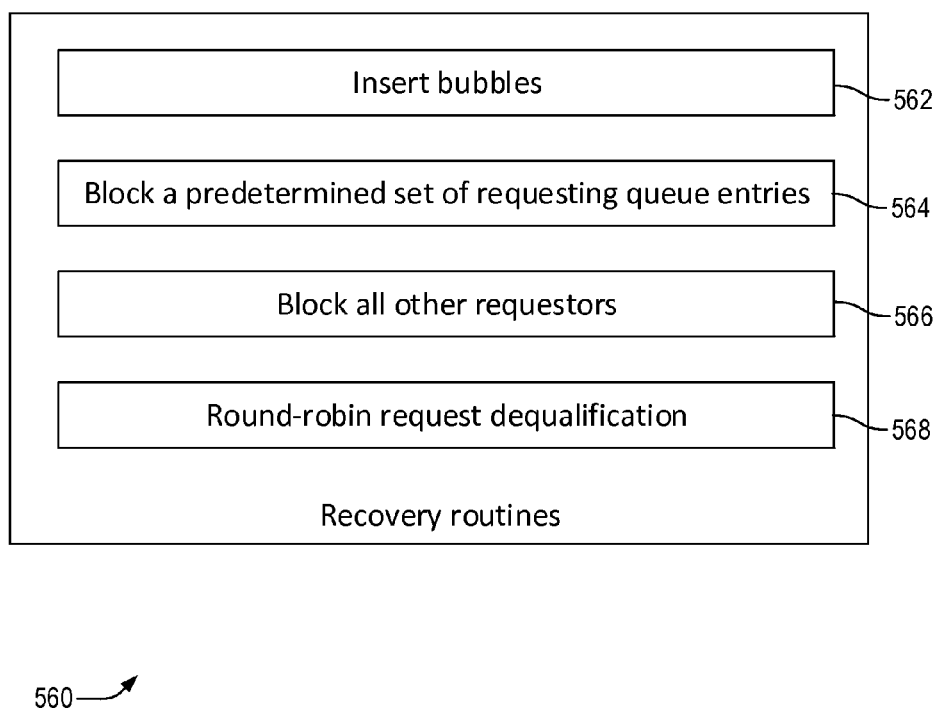
FIG. 13 is a functional block diagram illustrating a plurality of recovery routines.

The recovery routines 535 are configured to manipulate arbitration requests from associated queue entries in order to attempt to resolve a detected hang. FIG. 13 is a block diagram of one embodiment of a set of recovery routines 560 provided to the recovery logic 540.

One of the recovery routines 562 comprises inserting bubbles into a tag pipeline by systematically blocking arbitration requests. A second recovery routine 564 comprises blocking a predetermined set of requesting queue entries by dequalifying their requests. A third recovery routine 566 comprises blocking all requestors associated with a detector that is not asserting a likely starvation, livelock, or deadlock condition by causing the associated queue entries to dequalify their arbitration requests. A fourth recovery routine 568 comprises a round-robin request dequalification, wherein requests for arbitration from individual queues or queue entries are only allowed to proceed serially. In one embodiment, the recovery logic runs one recovery routine and rechecks for a hang condition before running a next recovery routine. However, unless so specified in the claims, the invention is not limited to these recovery routines, to any particular set of recovery routines, or to any particular ordering of the recovery routines.

While various embodiments of the present invention have been described herein, it should be understood that they have been presented by way of example, and not limitation. It will be apparent to persons skilled in the relevant computer arts that various changes in form and detail can be made therein without departing from the scope of the invention. Software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor comprising:
    a cache including a tag array, wherein the cache is arranged as a set-associative cache having a plurality of sets and a plurality of ways;
    a tagpipe that arbitrates access to the tag array; and
    a logic analyzer comprising:
    a read logic coupled to the tagpipe to read and capture snapshots of tagpipe arbs;
    wherein the logic analyzer records the snapshots of the tagpipe arbs, wherein the tagpipe arbs are transactions to access the tag array;
    wherein the snapshots are used to determine what tagpipe arbs comprise a hang or lead up to the hang and comprise information identifying a set and way of the plurality of sets and plurality of ways, respectively, to which the arb is assigned.

2. The microprocessor of claim 1, wherein the snapshots comprise information about whether the tagpipe arb is a load, snoop, store or other arb type.

3. The microprocessor of claim 1, wherein the snapshots comprise information about whether the tagpipe arb completed or replayed.

4. The microprocessor of claim 1, wherein the tagpipe comprises multiple stages and wherein the read logic captures snapshots of a stage of the tagpipe after the tagpipe has determined whether an arb is going to replay, complete, and/or require other queue pushes.

5. The microprocessor of claim 1, wherein the logic analyzer further comprises configuration logic that allows a user to selectively configure which snapshots the logic analyzer records.

6. The microprocessor of claim 1, wherein the logic analyzer further comprises configuration logic that allows a user to selectively configure starting and ending pointers between which to record snapshots of tagpipe arbs.

7. The microprocessor of claim 1, wherein the logic analyzer further comprises:
    a compression logic configured to compress the snapshots by logically OR-ing together different replayed tagpipe arb snapshots.

8. The microprocessor of claim 1, further comprising:
    a random access memory, wherein the logic analyzer further comprises a storage logic configured to store the snapshots into the random access memory.

9. A method for collecting information for use in detecting a starvation, livelock, or deadlock condition in a microprocessor, the method comprising:
    reading tagpipe arbs, which are transactions to access a tag array of a cache arranged as a set-associative cache having a plurality of sets and a plurality of ways, by use of a logic analyzer coupled to a tagpipe;
    recording, by use of the logic analyzer, at least a portion of the tagpipe arbs into memory storage;
    wherein the portion of the tagpipe arbs are used to determine what tagpipe arbs comprise a hang or lead up to the hang and comprise information identifying a set and way of the plurality of sets and plurality of ways, respectively, to which the arb is assigned.

10. The method of claim 9, wherein the step of recording includes recording information about whether the tagpipe arb is a load, snoop, store or other arb type.

11. The method of claim 9, wherein the step of recording includes recording information about whether the tagpipe arb completed or replayed.

12. The method of claim 9, wherein the tagpipe comprises multiple stages and wherein the logic analyzer is coupled to a stage of the tagpipe after the tagpipe has determined whether an arb is going to replay, complete, and/or require other queue pushes.

13. The method of claim 9, further comprising configuring which snapshots the logic analyzer records.

14. The method of claim 9, further comprising configuring the logic analyzer to selectively ignore certain tagpipe arbs.

15. The method of claim 9, further comprising selectively configuring starting and ending pointers between which to record snapshots of tagpipe arbs.

16. The method of claim 9, further comprising compressing the snapshots by logically OR-ing together different replayed tagpipe arb snapshots.

17. The method of claim 9, wherein the step of recording, by use of the logic analyzer, at least a portion of the tagpipe arbs into the memory storage is performed to store the snapshots into a random access memory of the microprocessor.

18. A non-transitory computer readable medium comprising:
    computer readable program code embodied in said medium, for specifying a microprocessor that has:
    a cache including a tag array, wherein the cache is arranged as a set-associative cache having a plurality of sets and a plurality of ways;

a tagpipe that arbitrates access to the tag array; and a logic analyzer comprising:

a read logic coupled to the tagpipe to read and capture snapshots of tagpipe arbs;

wherein the logic analyzer records the snapshots of the tagpipe arbs, wherein tagpipe arbs are transactions to access the tag array;

wherein the snapshots are used to determine what tagpipe arbs comprise a hang or lead up to the hang and comprise information identifying a set and way of the plurality of sets and plurality of ways, respectively, to which the arb is assigned; and wherein the cache is configured to perform recovery routines to resolve a detected starvation, livelock, or deadlock condition; and wherein the non-transitory computer readable medium comprises magnetic tape, semiconductor, magnetic disk, or optical disc, a network, or wire line.

\* \* \* \* \*